(12) United States Patent
Zimmermann et al.

(10) Patent No.: US 7,742,504 B2
(45) Date of Patent: Jun. 22, 2010

(54) CONTINUOUS MEDIA SYSTEM

(75) Inventors: Roger Zimmermann, Walnut, CA (US);
Cyrus Shahabi, Irvine, CA (US); Kun Fu, Los Angeles, CA (US); Shu-Yuen Didi Yao, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 1951 days.

(21) Appl. No.: 10/351,461

(22) Filed: Jan. 24, 2003

(65) Prior Publication Data

US 2003/0161302 A1 Aug. 28, 2003

Related U.S. Application Data

(60) Provisional application No. 60/351,656, filed on Jan. 24, 2002, provisional application No. 60/441,068, filed on Jan. 17, 2003.

(51) Int. Cl.
*H04H 20/28* (2008.01)
*G06F 15/16* (2006.01)
*H04N 7/173* (2006.01)

(52) U.S. Cl. .................. 370/487; 709/203; 725/87

(58) Field of Classification Search .............. 370/363, 370/368, 396, 398, 395.2, 395.21, 465, 485–487, 370/504, 507, 514–515; 709/203, 219, 227–231; 725/87, 139
See application file for complete search history.

(56) References Cited

U.S. PATENT DOCUMENTS

| | | | | |
|---|---|---|---|---|
| 5,721,815 A * | 2/1998 | Ottesen et al. | ............. | 715/721 |
| 5,805,804 A * | 9/1998 | Laursen et al. | ............. | 709/223 |
| 6,119,244 A * | 9/2000 | Schoenthal et al. | ........... | 714/4 |
| 6,134,596 A * | 10/2000 | Bolosky et al. | ............. | 709/233 |
| 6,161,137 A * | 12/2000 | Ogdon et al. | ............... | 709/224 |
| 6,222,531 B1 * | 4/2001 | Smith | ......................... | 715/803 |
| 6,301,249 B1 * | 10/2001 | Mansfield et al. | ........... | 370/394 |
| 6,415,328 B1 * | 7/2002 | Korst | .......................... | 709/232 |
| 6,456,599 B1 * | 9/2002 | Elliott | ......................... | 370/254 |
| 6,654,757 B1 * | 11/2003 | Stern | .......................... | 707/101 |
| 6,868,094 B1 * | 3/2005 | Bordonaro et al. | .......... | 370/516 |
| 6,886,074 B1 * | 4/2005 | Narayanaswamy et al. | . | 711/114 |
| 7,076,560 B1 * | 7/2006 | Lango et al. | ................. | 709/231 |

(Continued)

OTHER PUBLICATIONS

S. Berson, S. Ghandeharizadeh, R. Muntz, and X. Ju. Staggered Stripping in Multimedia Information Systems. In the *Proceedings of the ACM SIGMOD International Conference on Management of Data*, 1994.

(Continued)

*Primary Examiner*—Frank Duong
*Assistant Examiner*—Redentor M Pasia
(74) *Attorney, Agent, or Firm*—Fish & Richardson P.C.

(57) ABSTRACT

Systems and techniques for transmitting data stream to a client include transmitting a data segment from one of a plurality of nodes of a continuous media server to a client according to a scheduler on the node. A system includes a plurality of data processing devices, each data processing device coupled with at least one storage device. Each data processing device includes a scheduler to schedule transmission of the data segment to a client in sequence with other data segments, and a module to transmit the data segment to the client.

22 Claims, 5 Drawing Sheets

U.S. PATENT DOCUMENTS

| | | | | |
|---|---|---|---|---|
| 7,301,944 | B1* | 11/2007 | Redmond | 370/390 |
| 7,315,544 | B2* | 1/2008 | Thompson et al. | 370/394 |
| 2002/0046359 | A1* | 4/2002 | Boden | 714/6 |

OTHER PUBLICATIONS

S. Berson, L. Golubchik, and R. R. Muntz. Fault Tolerant Design of Multimedia Servers. In *Proceedings of the ACM SIGMOD International Conference on Management of Data*, 1995.

E. Chang and H. Carcia-Molina. Efficient Memory Use in a Media Server. In *Proceedings of the International Conference on Very Large Databases*, 1997.

D. J. Gemmell, H. M. Vin, D. D. Kandlur, P. V. Rangan, and L. A. Rowe. Multimedia Storage Servers: A Tutorial.

S. Ghandeharizadeh, S. H. Kim, W. Shi, and R. Zimmermann. On Minimizing Startup Latency in Scalable Continuous Media Servers. In *Proceedings of Multimedia Computing and Networking 1997*, pp. 144-155, Feb. 1997.

A. Goel, C. Shahabi, S.Y.D. Yao, and R. Zimmermann. SCADDAR: An Efficient Randomized Technique to Reorganize Continuous Media Blocks. In *Proceedings of the International Conference of Data Engineering*, 2002.

J. Hibbard. What the $%@# is DivX;-)? *Red Herring Magazine*, Jan. 2001.

W. Jiang and H. Schulzrinne. Modeling of Packet Loss and Delay and Their Effect on Real-Time Multimedia Service Quality. In *The 10th International Workshop on Network Operating System Support for Digital Audio and Video (NOSSDAV 2000)*, Jun. 2000.

D. Loguinov and H. Radha. On Retransmission Schemes for Real-time Streaming in the Internet. In *INFOCOM*, pp. 1310-1319, 2001.

Marasli, P.d. Amer, and P. T. Conrad. Retransmission-Based Partially Reliable Transport Service: An Analytic Model. In *INFOCOM (2)*, pp. 621-629, 1996.

C. Papadopoulos and G. M. Parulkar. Retransmission-Based Error Control for Continuous Media Applications. In Proceedings of the 6th International Workshop on Network Operating Systems Support for Digital Audio and Video (NOSSDAV 1996), Zushi, Japan, Apr. 23-26, 1996.

S. Pejhan, M. Schwartz, and D. Anastassiou. Error Control using Retransmission Schemes in Multicast Transport Protocols for Real-time Media. *IEEE/ACM Transactions on Networking*, 4(3):413-427, 1996.

V. Polimenis. The Design of a File System that Supports Multimedia. Technical Report TR-91-020, ICIS, 1991.

J. R. Santos and R. R. Muntz. Performance Analysis of the RIO Multimedia Storage System with Heterogeneous Disk Configurations. In *Proceedings of the ACM Multimedia Conference*, pp. 303-308, Bristol, UK, Sep. 12-16, 1998.

J. R. Santos, R. R. Muntz, and B. Ribeiro-Neto. Comparing Random Data Allocation and Data Striping in Multimedia Servers. In *Proceedings of the ACM SIGMETRICS*, Santa Clara, California, Jun. 17-21, 2000.

M. Seltzer, P. Chen, and J. Ousterhout. Disk Scheduling Revisited. In *Proceedings of the 1990 Winter USENIX Conference*, pp. 313-324, Washington DC, Usenix Association, 1990.

C. Shahabi, R. Zimmermann, K. Fu, and S. Y. D. Yao. Yima: A Second-Generation Continuous Media Server. *IEEE Computer*, pp. 56-64, Jun. 2002.

C. Shahabi, G. Barish, B. Ellenberger, N. Jiang, M. Kolandouzan, A. Nam, and R. Zimmermann. Immersidata Management: Challenges in Management of Data Generated within an Immersive Environment. In *Proceedings of the International Workshop of Media Information Systems*, Oct. 1999.

C. Shahabi, S. Ghandeharizadeh, and S. Chaudhuri. On Scheduling Atomic and Composite Multimedia Objects. In *Transactions on Knowledge and Data Engineering*, 2001.

C. Shahabi and F. Banaei-Kashani. Decentralized Resource Management for a Distributed Continuous Media Server. *IEEE Transactions on Parallel and Distributed Systems*, vol. 13, No. 6, Jun. 2002.

E. A. Taub. On Internet of the Future, Surfers May Almost Feel the Spray. The *New York Times*, p. C4 of the Circuits section, Thursday, May 9, 2002. URL: http://dmrl.usc.edu/pubs/NYTimes-RMI.pdf.

F. Tobagi, J. Pang, R. Baird, and M. Gang. Streaming RAID-A Disk Array Management System for Video Files. In *Proceedings of the First SCM Conference on Multimedia*, Aug. 1993.

M. Yajnik, S. B. Moon, J. F. Kurose, and D. F. Towsley. Measurement and Modeling of the Temporal Dependence in Packet Loss. In *INFOCOM (1)*, pp. 345-352, 1999.

R. Zimmermann, Kun Fu, Cyrus Shahabi, Shu-Yuen Didi Yao, and Hong Zhu. Yima: Design and Evaluation of a Streaming Media System for Residential Broadband Services. In *Proceedings of VLDB Workshop on Databases in Telecommunications*, Sep. 2001.

R. Zimmermann and S. Ghandeharizadeh. Continuous Display Using Heterogeneous Disk-Subsystems. In *Proceedings of the Fifth ACM Multimedia Conference*, pp. 227-236, Seattle, Nov. 9-13, 1997.

R. Zimmermann, K. Fu, M. Jahangiri, and C. Shahabi. A Multi-Threshold Online Smoothing Technique for Variable Rate Multimedia Streams.

Zimmerman et al, "Retransmission-Based Error Control in a Many-to-Many Client-Server Environment," Proceedings of the Multimedia Computing and Networking (MMCN 2003), Santa Clara, California, (Jan. 20-24, 2003), 11 pages.

\* cited by examiner

CONTINUOUS MEDIA SYSTEM

CROSS-REFERENCE TO RELATED APPLICATIONS

The present application claims priority to U.S. Provisional Patent Application No. 60/351,656, entitled "YIMA JADE: A SCALABLE LOW-COST STREAMING MEDIA SYSTEM," filed on Jan. 24, 2002, which is hereby incorporated by reference in its entirety;

The present application claims priority to U.S. Provisional Patent Application No. 60/441,068, filed Jan. 17, 2003, entitled "RETRANSMISSION-BASED ERROR CONTROL IN A MANY-TO-MANY CLIENT-SERVER ENVIRONMENT," which is hereby incorporated by reference in its entirety.

STATEMENT AS TO FEDERALLY SPONSORED RESEARCH

This invention was made with government support under Contract Nos. EEC-9529152 (IMSC ERC) and IIS-0082826 awarded by the National Science Foundation. The government has certain rights in the invention.

BACKGROUND

Continuous media systems may be used to provide real-time data, such as video data, audio data, haptic data, avatar data, and application coordination data, to end users.

Continuous media systems face a number of challenges. First, the systems may need to be able to transmit the data from a storage location to a client location so that the client can display, playback, or otherwise use the data in real time. For example, the systems may need to provide streaming video data for real-time display of a movie. If the real-time constraints are not satisfied, the display may suffer from disruptions and delays, termed "hiccups." In order to reduce disruptions, continuous media clients generally include a buffer for storing at least a portion of the media data prior to display to the user.

Additionally, continuous media systems need to deal with large data objects. For example, a two-hour MPEG-2 video with a 4 Megabit per second (Mb/s) bandwidth requirement is about 3.6 Gigabytes (GB) in size.

Available continuous media servers generally fall within one of two categories: single-node, consumer oriented systems (for example, low-cost systems serving a limited number of users), and multi-node, carrier class systems (for example, high-end broadcasting and dedicated video-on-demand systems).

SUMMARY

In general, in one aspect, a system includes a plurality of data processing devices, with each data processing device coupled with at least one of a plurality of storage devices to storing data.

Each of the data processing devices may include a module to retrieve a data segment from one of the coupled storage devices. Each of the data processing devices may include a module to schedule transmission of the data segment to a client in sequence with other data segments. Each of the data processing devices may include a module to transmit the data segment to the client and not to another of the data processing devices.

At least one of the data processing devices may include a module to provide control information to transmit a data stream to a client, where the data stream comprises a sequence of data segments.

The modules may be implemented in software and/or hardware. The modules may be implemented as circuitry in one or more integrated circuits. Each of the data processing devices may be implemented as one or more integrated circuits; for example, each may be implemented in a central processing unit (CPU).

The system may also include a module to place data segments on the storage devices. The data segments may be placed using a round-robin placement technique, a random technique, or a pseudorandom technique.

The system may further include one or more network communication devices coupled to the data processing devices. For example, the system may include a local network switch to couple the data processing devices to a network.

In general, in one aspect, a method includes receiving a request for a data stream from a client. One of a plurality of nodes may be designated to provide control information for transmitting the data stream to the client. The data stream may be transmitted as a sequence of data segments. Each of the data segments may be transmitted to the client in one or more data packets.

Transmitting the data stream to the client may include transmitting a first data segment from a first node to the client according to a scheduler on the first node, and subsequently transmitting a second data segment from a second node to the client according to a scheduler module of the second node. Each of the nodes may include one or more data processing devices.

The method may further include transmitting control information from the node designated to provide control information to the first node. At least some of the control information may be provided to the scheduler of the first node. The scheduler may schedule transmission of the first data segment using the control information.

The method may also include transmitting a third data segment from the node designated to provide control information.

The control information may be provided according to the real-time streaming protocol (RTSP). Data may be transmitted according to the real-time transport protocol (RTP).

In general, in one aspect, a system includes a controller module to transmit a request for a data stream to a server having a plurality of nodes. The controller module may be configured to receive the data stream as a sequence of data segments from more than one of the plurality of nodes. The data segments may be received in one or more data packets.

The controller may include a real-time streaming protocol (RTSP) module. The controller may include a real-time transport protocol module (RTP).

The system may also include a buffer to store at least some of the data segments. The system may also include a decoder to decode the data.

The system may include a module to determine whether there is a gap in the local sequence numbers of received data packets, where the local sequence number indicates the source node of the data packet. The system may include a memory to store local sequence numbers of packets received by the controller. The system may include a module to determine a particular node corresponding to a gap in the local sequence numbers. The system may include a module to send a retransmission request to the particular server node. The module may be included in the controller.

The system may further include a user interface module. The system may further include a playback module. The system may further include one or more speakers and/or one or more displays for presenting the data stream to a user.

In general, in one aspect, a method includes requesting a first data stream including a first segment of continuous media data to be presented to a user. The method may further include requesting a second data stream, the second data stream including a second segment of different continuous media data, the second segment to be presented to the user in synchronization with the first segment.

The method may further include receiving the first segment from a node of a continuous media server, and receiving the second segment from a different node of the continuous media server. The method may further include decoding the first segment and the second segment. The method may further include presenting the decoded first and second segments to a user at substantially the same time.

In general, in one aspect, a method may include transmitting a request for a data stream to a server including a plurality of nodes. Each of the plurality of nodes may be to store segments of the data stream and to transmit the segments of the data stream in a sequence according to a scheduler module on the respective node.

The method may further include receiving a plurality of data packets from the plurality of nodes, each of the plurality of data packets including at least a portion of one of the segments, as well as a local sequence number indicating which of the plurality of nodes transmitted the respective data packet.

The method may further include determining whether a data packet was not received by detecting a gap in the local sequence number. The method may further include, if a data packet was not received, determining which of the nodes transmitted the packet that was not received using the local sequence number. The method may further include transmitting a retransmission request to the node that transmitted the data packet that was not received.

The details of one or more implementations are set forth in the accompanying drawings and the description below. Other feature and advantages will be apparent from the description and drawings, and from the claims.

DESCRIPTION OF DRAWINGS

Like reference symbols in the various drawings indicate like elements.

DETAILED DESCRIPTION

Figure 1:
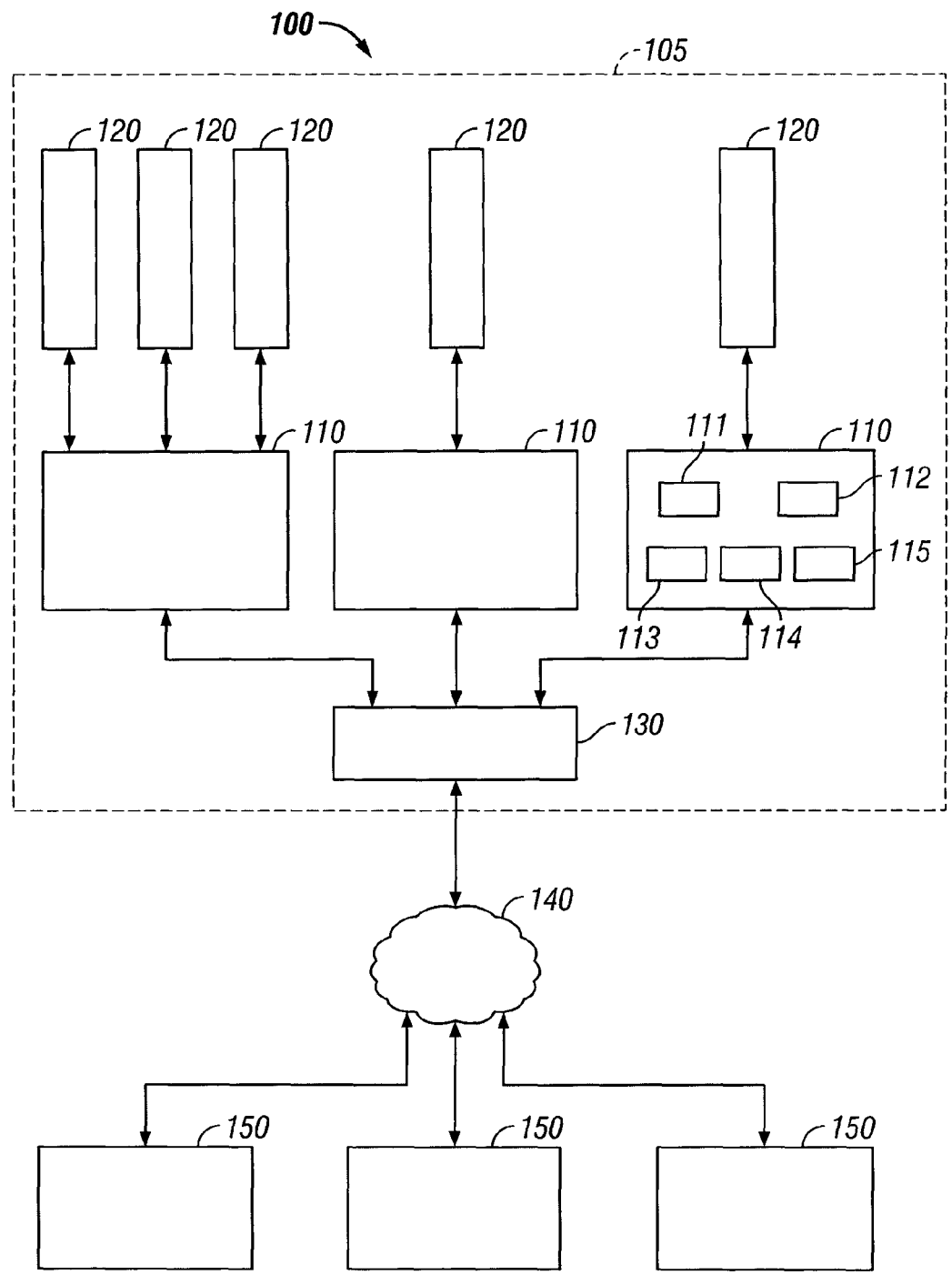
FIG. 1 is a schematic of a continuous media system.

Referring to FIG. 1, a continuous media system 100 is shown. A server 105 includes a number of nodes 110, with each node 110 coupled with one or more data storage devices such as storage disks 120. Each node includes one or more data processing devices, such as one or more CPUs or other data processing circuitry.

For example, each node may include a module 111 to retrieve data segments from one of the associated storage disks 120 (e.g., a file input/output module), a module 112 to schedule transmission of the data segments to one or more clients 150 (e.g., a scheduler module), a module 113 to transmit the data segments to clients 150 (e.g., a real-time transport protocol (RTP) module), and optionally a module 114 to provide control information for transmitting a data stream to clients 150 (e.g., a real-time streaming protocol (RTSP) module), where the data stream includes a plurality of data segments stored among nodes 110. In some implementations, modules 111-115 may be implemented at least partially as software. The data segments may include all of a particular block of data stored on a node 110, or a portion of a particular block of data stored on a node 110.

Each node 110 may be coupled to a network 140. For example, each node 110 may include a network interface module 115 (e.g., a network interface card (NIC)) for coupling with a network communication device such as a network switch 130 to connect to clients 150 via network 140.

Figure 2:
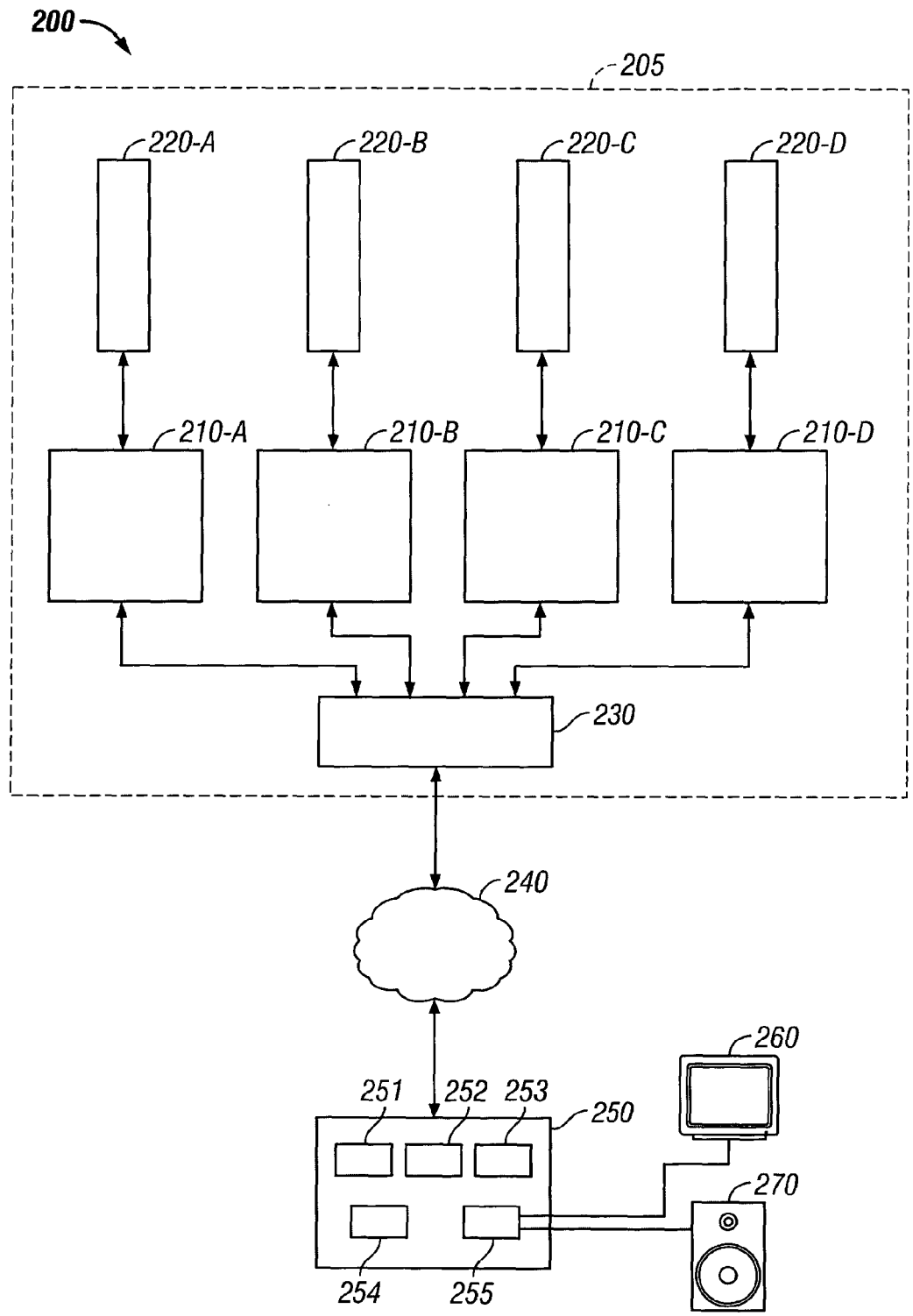
FIG. 2 is a schematic of a different implementation of a continuous media system.

Referring to FIG. 2, according to a particular implementation, a continuous media system 200 includes a server 205. Server 205 includes four clustered nodes 210-A through 210-D, where each node includes a Dell PowerEdge 1550 Pentium III 866 MHz PC with 256 MB of memory running Red Hat Linux. The continuous media data are stored on four storage devices 220-A through 220-D, which are each 18 GB Seagate Cheetah hard disk drives connected to the server nodes 210-A through 210-D via Ultra 160 SCSI channels.

Nodes 210-A through 210-D may communicate with each other and send media data via multiple 100 Mb/s Fast Ethernet Network Interface Card (NIC) connections. Server 205 may include a local network switch 230, which may be a Cabletron 6000 switch coupled with either one or two Fast Ethernet lines. Switch 230 is coupled with a network 240; for example, switch 230 is coupled with both a WAN backbone (to serve distant clients) and a LAN environment (to serve local clients). An IP-based network may be chosen to keep the per-port equipment cost low and for easy compatibility with the public Internet.

Clients such as client 250 of FIG. 2 may be based on a commodity PC platform, and may run, e.g., Red Hat Linux or Windows NT. Client 250 need not be a PC or computer, but may be any device to receive continuous media data for presentation to or use by a user. For example, client 250 may be a personal data assistant (PDA), and network 240 may be a wireless network.

Client 250 includes a controller module 251 to enable client 250 to request data and to receive data. For example, controller module 251 may include a Real Time Streaming Protocol (RTSP) controller and a Real-Time Transport Protocol (RTP) controller. Client 250 may also include a user interface 252, a client buffer 253, a playback module 254, and a media decoder 255. Decoder 255 may be coupled with one or more displays 260 and/or one or more speakers 270 for displaying video data and playing back audio data.

Figure 3:
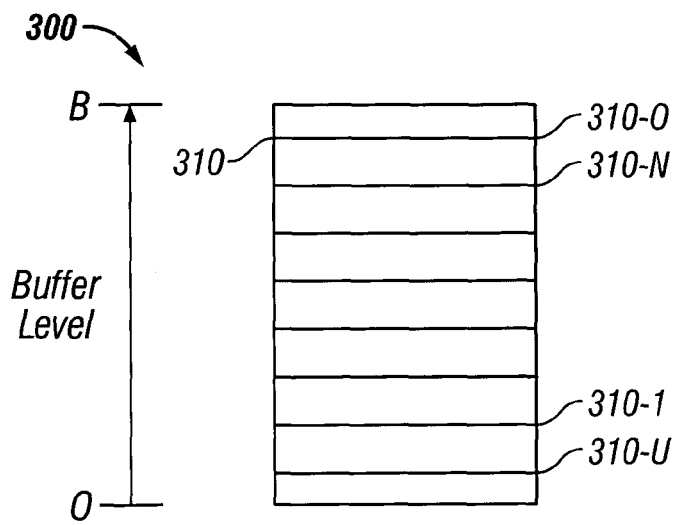
FIG. 3 shows a multi-threshold buffer model.

Referring to FIGS. 2 and 3, buffer 253 may be a circular buffer with a capacity denoted by B. A buffer model 300 may include a number of thresholds 310 that may be used to regulate server transmission rates to ensure that buffer 253 neither underflows nor overflows.

Buffer 253 reassembles variable bit-rate media streams from data included in packets that are received from the server nodes. Note that the data included in a packet need not be exactly a block of data stored on a particular server node. For example, in some implementations, a continuous media file may be stored among storage devices in blocks of data of a particular size, where the blocks may be significantly larger than the amount of data included in a packet. In such a case, multiple packets may be transmitted in order to transmit the entire block of data.

If the server transmits packets at a greater rate than the client consumes them, buffer 253 may exceed its capacity; that is, it may overflow. If the client consumes packets faster than the server transmits them, buffer 253 may empty (underflow or starve). Buffer underflow or overflow may lead to disruption of the presentation of the data to the user.

Server-controlled techniques may be used to smooth the consumption rate $R_C$ by approximating a number of constant rate segments. However, such algorithms implemented at the server side may need complete knowledge of $R_C$ as a function of time.

To better enable work in a dynamic environment, a client-controlled buffer management technique may be used. Referring to FIG. 3, a multi-threshold buffer model 300 may be used with buffer 253 of FIG. 2. Buffer model 300 includes a plurality of buffer levels 310, including an overflow threshold 310-O, an underflow threshold 310-U, and may include a plurality of N intermediate thresholds 310-1 through 310-N. In order to avoid buffer underflow or overflow, the client uses one or more of thresholds 310 to determine an appropriate server sending rate, and then forwards server sending information to the server. Client-controlled buffer management techniques include pause/resume flow control techniques, and multi-threshold flow control techniques.

Pause/Resume Flow Control

According to the pause/resume scheme, if the data in the buffer reaches threshold 310-O, the data flow from server 205 is paused. The playback will continue to consume data from buffer 253. When the data in buffer 253 reaches watermark 310-U, the delivery of the stream is resumed from server 205. If the delivery rate $R_N$ of the data is set correctly, buffer 253 will not underflow while the stream is resumed. A safety margin in both watermarks 310-O and 310-U may be set in order to accommodate network delays.

Multi-Threshold Flow Control

The inter-packet delivery time $\Delta r$ is used by schedulers included in nodes 210-A to 210-D to transmit packets to client 250. In an implementation, schedulers use the Network Time Protocol (NTP) to synchronize time across nodes 210-A through 210-D. Using a common time reference and the timestamp of each packet, nodes 210-A through 210-D send packets in sequence at $\Delta r$ time intervals. Client 250 fine-tunes the $\Delta r$ delivery rate by updating server 205 with new $\Delta r$ values based on the amount of data in buffer 253.

Fine tuning may be accomplished, for example, by using one or more additional intermediate watermarks such as watermarks 310-1 and 310-N of FIG. 3. Whenever the level of data in buffer 253 reaches a watermark, a corresponding $\Delta r$ speedup or slowdown command is sent, with the goal of preventing buffer starvation or overflow. Buffer 253 is used to smooth out any fluctuations in network traffic or server load imbalance, which could lead to display/playback disruptions. Thus, client 250 may control the delivery rate of received data to achieve smoother delivery, prevent bursty traffic, and keep a fairly constant buffer level. For additional details on systems and techniques that may be used for traffic smoothing, please see the pending U.S. patent application Ser. No. 10/351,462, entitled "MULTI-THRESHOLD SMOOTHING," filed Jan. 24, 2003, which is hereby incorporated by reference in its entirety.

Client software may need to work with a variety of media types. Client 250 may include a playback module 254. The playback thread interfaces with media decoder 255. Decoder 255 may be hardware and/or software based.

For example, decoder 255 may include a CineCast hardware MPEG decoder, available from Vela Research. The CineCast decoder supports both MPEG-1 and MPEG-2 video, as well as two channel audio. Alternatively, for content including 5.1 channels of Dolby Digital audio (e.g., as used in DVD movies), decoder 255 may include the Dxr2 PCI card from Creative Technology, which may be used to decompress both MPEG-1 and MPEG-2 video in hardware, as well as to decode MPEG audio and provide a 5.1 channel SP-DIF digital audio output terminal.

Decoder 255 may include a decoder called DivX;-) for decoding MPEG-4 media. MPEG-4 generally provides a higher compression ratio than MPEG-2. For example, a typical 6 Mb/s MPEG-2 media file may only require a 800 Kb/s delivery rate when encoded with MPEG-4. Using an implementation of a continuous media system where a client included the DivX;-) decoder, an MPEG-4 video stream was delivered at near NTSC quality to a residential client site via an ADSL connection.

High definition television (HDTV) clients present additional challenges. First, HD media require a high transmission bandwidth. For example, a video resolution of 1920× 1080 pixels encoded via MPEG-2 results in a data rate of 19.4 Mb/s. Using an open source software decoder called mpeg2dec, frame rates of about 20 frames per second were obtained using a dual-processor 933 MHz Pentium III, using unoptimized code. Using a Vela Research Cinecast HD add-on board, full frame rate high definition video playback (e.g., 30 resp. 60 frames per second) were obtained at a data rate up to about 45 Mb/s. The examples given here are for illustrative purposes only; other decoders, frame rates, and data rates are possible.

Multi-Node Server Modes

Figure 4A:
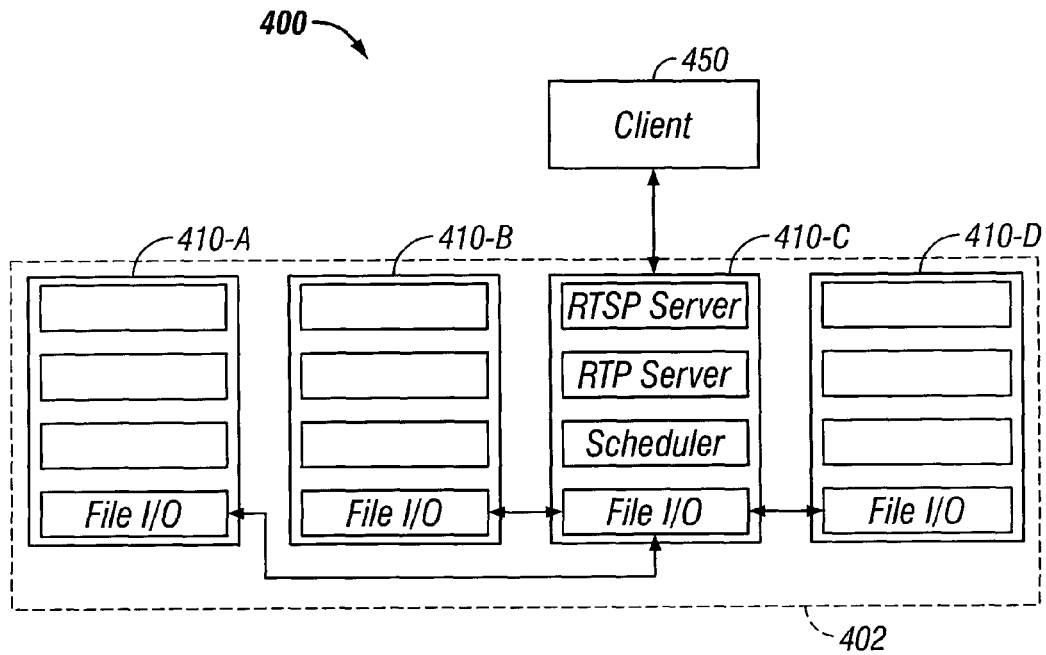
FIG. 4A shows a continuous media system having a master-slave configuration.
Figure 4B:
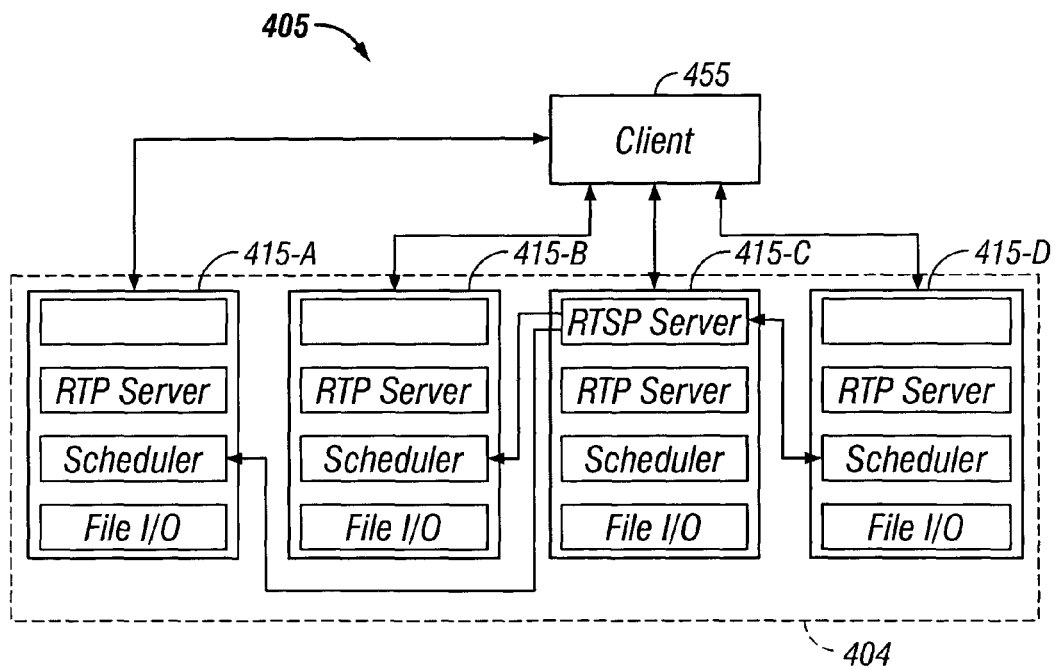
FIG. 4B shows a continuous media system having a bipartite configuration.

Referring to FIGS. 4A and 4B, a continuous mode system such as system 100 of FIG. 1 or system 200 of FIG. 2 may run in two modes: master/slave mode (FIG. 4A), or bipartite mode (FIG. 4B).

Master/Slave

One technique to enable a server application to access storage resources located on multiple nodes is to introduce a distributed file system. An application running on a specific node operates on all local and remote files via a network protocol to the corresponding node (for remote files).

Referring to FIG. 4A, a client 450 sends a request for continuous media data to a server 402. A particular node such as a node 410-C is designed as a master node for providing the requested to client 450. In some implementations, each node 410 may be capable of acting as a master node, while in other implementations, fewer than all of the nodes 410 may be capable of acting as a master node. If multiple nodes are capable of acting as a master node, one of the capable nodes is designated as the master node for a particular client request; for example, using a round-robin domain name service (RR-DNS) or a load-balancing switch.

For a particular request, the requested data may be distributed among the nodes 410-A through 410-D to maintain a balanced load. As described more fully below and in the pending U.S. patent application Ser. No. 10/351,269, entitled "PSEUDORANDOM DATA STORAGE," filed Jan. 24, 2003, which is hereby incorporated by reference in its entirety, a pseudorandom distribution may be used to distribute the data and to reduce the overhead required to store and retrieve the desired data. As a result, blocks of the requested data are generally distributed among each of the nodes 410-A through 410-D.

Master node 410-C brokers the client request to slave nodes 410-A, 410-B, and 410-D. A distributed file system application resident on the master node 410-C, which may include multiple input/output modules, requests and subsequently receives desired data from a distributed file system application resident on each of the slave nodes 410-A, 410-B, and 410-D. Additionally, a scheduler resident on master node 410-C schedules packet transmission to the client for all of the requested data. Thus, all of the data is channeled to client 450 through master node 410-C.

Exemplary software for this technique includes two components: a high-performance distributed file system application, and a media streaming server application. The distributed file system may include multiple file input/output (I/O) modules located on each node. The media streaming server application may includes a scheduler, a real-time streaming protocol (RTSP) module, and a real-time protocol (RTP) module. In other implementations, other protocols may be used. Each node 410-A through 410-D runs the distributed file system, while at least some nodes such as node 410-C also run the media streaming server application.

A particular master server node such as node 410-C is a point of contact for a client such as client 450 during a session. A session may be a complete RTSP transaction for a continuous media stream. When a client requests a data stream using RTSP, it is directed to a master server node which in turn brokers the request to the slave nodes.

An advantage of a distributed file system is that applications need not be aware of the distributed nature of the storage system. Applications designed for a single node may, to some degree, take advantage of the cluster organization. For example, a media streaming server application for implementing a master/slave mode may be based on the Darwin Streaming Server (DSS) project by Apple Computer, Inc. The media streaming server application assumes that all media data are located in a single, local directory. Enhanced with the distributed file system described here, multiple copies of DSS code (each running on its own master node) may share the same media data. This also simplifies client design, since all RTSP control commands may still be sent to only one server node.

Although the master/slave configuration allows for ease of utilizing clustered storage, it may have a number of drawbacks. For example, the master node may become a bottleneck, the master node may be a single point of failure, and there may be heavy inter-node traffic. The master/slave configuration becomes less practical as the number of nodes and/or the number of storage devices is scaled up, since the master node must generally request and receive data from each storage device (for load balancing purposes). For applications where the drawbacks may limit performance, the bipartite design below may be a better choice.

Bipartite

A bipartite configuration may be used rather than a master/slave configuration. In a bipartite configuration there are two groups of nodes, termed a server group and a client group.

Referring to FIG. 4B, a client 455 transmits a request for data to a server 404. Server 404 includes multiple nodes such as nodes 415-A through 415-D. Rather than having centralized scheduler, RTSP, and RTP server modules (as in the implementation of a master/slave configuration described above), each node 415 may include a distributed file system, RTSP module, RTP server module, and scheduler.

In response to a client request for media data, one node (e.g., node 415-C in FIG. 4B) is designated to be the source of control information for providing the requested data to client 455. From the client's point of view, in an implementation using the RTSP and RTP protocols, only the RTSP module is centralized. The RTP application, schedulers, and File I/O modules operate on each node 415-A through 415-D. As a result, each node 415 may retrieve, schedule, and send local data blocks directly to the requesting client (again, note that packets of data transmitted from a node to a client may include less data than the block of data stored on the particular server node). Therefore, there is no bottleneck of a master node, like there may be using the master/slave configuration. Additionally, inter-node traffic may also be significantly reduced using a bipartite configuration.

To implement a bipartite configuration, clients need to be able to receive the requested data from multiple nodes, as described below. Additionally, a distributed scheduler was developed to replace the DSS code used in the master/slave configuration. Further, a flow control mechanism was developed to reduce or eliminate the problem of client buffer overflow or starvation.

In the bipartite configuration, each client maintains contact with one RTSP module for the duration of a session, for control related information. Each server node may include an RTSP module, and an RR-DNS or load-balancing switch may be used to decide which RTSP server to contact. In this configuration, clients may communicate with individual nodes for retransmissions; thus, a simple RR-DNS may not be used to make the server cluster appear as one node. However, the bipartite configuration may be quite robust; if an RTSP server fails, sessions need not be lost. Instead, they may be reassigned to another RTSP server so the delivery of data is generally uninterrupted.

An adapted MPEG-4 file format as specified in MPEG-4 Version 2 may be used for the storage of media blocks. The adaptation of the current system expanded on the MPEG-4 format by allowing compressed media data other than MPEG-4 (for example, MPEG-2) to be encapsulated.

Flow Control

As described above, different flow control techniques may be used to vary the server transmission rate so that the client buffer neither overflows or underflows. These techniques include the above-described pause/resume and multi-threshold flow control techniques described above.

Multi-Stream Synchronization

Flow control techniques implemented in client-server communications protocol allow synchronization of multiple, independently stored media streams. Multi-stream synchronization may be important when, for example, video data and audio data are included in different streams and yet need to be synchronized during playback to the user.

Figure 5:
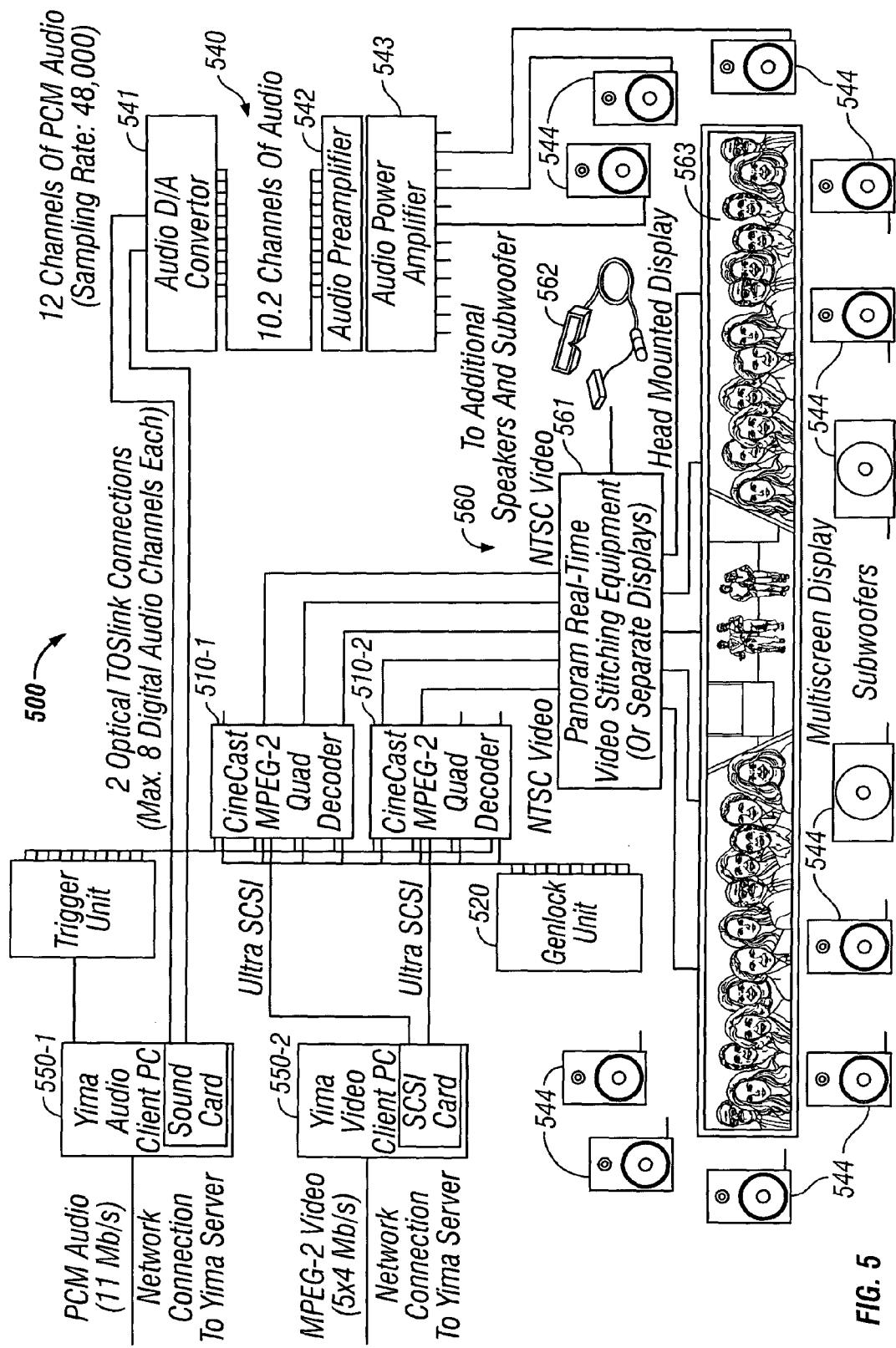
FIG. 5 is a block diagram of a panoramic video and 10.2 channel audio playback system.

Referring to FIG. 5, a client configuration 500 is shown for an implementation including playback of panoramic, 5 channel video and 10.2 channel audio. The five video channels originate from a 360-degree video camera system such as the FullView model from Panoram Technologies. A first client 550-1 requests and receives the five video channels, where each video channel is encoded into a standard MPEG-2 program stream. First client 550-1 includes a SCSI card. A second client 550-2 requests and receives the 10.2 channels of high-quality, uncompressed audio. Here, the 0.2 of the 10.2 channels refers to two low-frequency channels for playback by, e.g., subwoofers. Second client 550-2 includes a sound card. Note that in other implementations, a single client may request and receive data streams for both video and audio.

Precise playback may be achieved using three levels of synchronization: (1) block-level via retrieval scheduling, (2) coarse-grained via the flow control protocol, and (3) fine-grained through hardware support. The flow control protocol allows approximately the same amount of data to be maintained in the client buffers. The MPEG decoders may be lock-stepped to produce frame-accurate output using multiple CineCast decoders such as decoders 510-1 and 510-2, as well as a timing signal, which may be generated using a genlock timing signal generator device 520. The timing signal is provided to decoders 510-1 an 510-2 (which, in this implementation, include an external trigger input which allows for accurate initiation of playback through software), as well as a trigger unit 530 for the audio data.

The audio data is provided to an audio system 540, including an audio digital to analog (D/A) converter 541, a pre-amplifier 542, an audio power amplifier 543, and speakers 544. Note that for 10.2 channel audio, speakers 544 include ten speakers and two subwoofers. The video data is provided to a video system 560, including a Panoram real-time video stitching equipment 561 and displayed using a head-mounted display 562, a multi-screen display 563, or one or more other displays.

As a result, during playback, all of the video streams are rendered in tight synchronization such that the five video frames that correspond to one time instance are accurately combined into a panoramic 3600×480 mosaic every 1/30 of a second. The audio playback (here, surround-sound audio) is presented phase-accurately and in synchronization with the video.

Although the previous example discusses five video channels and 10.2 audio channels, using a client with two 4-channel CineCast decoders and a client with a multi-channel soundcard, up to eight synchronous streams of MPEG-2 video and 16 audio channels have been rendered. Many other implementations are possible.

Data Placement and Scheduling

Different techniques may be used to assign data blocks in the storage medium. For example, continuous media data may be stored in a magnetic disk drive according to a round-robin sequence or in a random manner. The storage medium can be implemented in at least one medium chosen from group consisting of a magnetic medium, a semiconductor medium, and an optical medium.

However, each of these techniques has one or more drawbacks. For example, round-robin placement makes scaling the system up difficult, since most of the data must be redistributed each time a new storage device is added. Additionally, the initial startup latency for an object might be large under heavy loads.

Using the random approach may reduce the startup latency, and may provide for a more balanced server load. However, the random approach may require storage of a large amount of meta-data: generally, the location of each block $X_i$ is stored and managed in a centralized repository (e.g., tuples of the form <$node_z, disk_y$>).

The current inventors recognized that by using a pseudorandom block placement, many advantages of the random approach may be obtained, while the disadvantages may be mitigated. With pseudorandom number generators, a seed value initiates a sequence of random numbers. Such a sequence is pseudorandom because it can be reproduced if the same seed value is used. Therefore, using a pseudorandom approach only a seed for each file object is stored, rather than the location of every block. Block locations can always be recomputed, using the stored seed value. Further, since the numbering of the disks is global across the server nodes, blocks will be assigned to random disks across different nodes.

For additional details on pseudorandom block placement, please see the above-referenced U.S. patent application entitled "PSEUDORANDOM DATA STORAGE."

Scalability, Heterogeneity, and Fault-Resilience

The continuous media system described herein is scalable, heterogeneous, and fault resilient. Scalability refers to the ease with which the capacity of a system may be changed. Usually, it refers to the ease with which the capacity may be increased to satisfy growth in user demand and/or increased application demands. Heterogeneity refers to the even distribution of data across server nodes. Fault-resilience refers to the ability of a system to overcome a fault within the system.

The current system may provide for enhanced scalability over prior systems. First, using the pseudorandom block placement method, adding more storage to the system entails moving only a fraction of the stored data. In contrast, when adding or removing a disk in a system using round-robin striping, almost all of the data blocks may need to be relocated. Further, only the new seed may need to be stored. In contrast, the random technique may require storing meta-data for the position of each block.

Scalability may also be enhanced by using the bipartite mode described herein. Using the bipartite mode, the number of nodes included in a server may be larger than the number of nodes that may be practically in a master/slave mode. As stated above and illustrated in FIG. 4A, operating a continuous media system using the master/slave mode requires inter-node communication. As the number of nodes is increased, the amount of inter-node communication increases. At some point, the amount of inter-node traffic will exceed the ability of the system to provide the requested data to the client in a timely manner.

In addition, the continuous media system illustrated in FIG. 1 provides a modular design that may easily be expanded. Rather than a single storage device, such as a magnetic disk, multi-disk arrays may be employed. Additionally, multiple nodes may be used, where commodity personal computers (PCs) may be used for one or more of the nodes. As the capability of commodity PCs increases with time, the older PCs may be easily replaced with newer PCs. This modular architecture is both scalable and cost-effective.

To improve fault-resilience of the current system, a parity-based data redundancy scheme may be used. Using a continuous media system such as system 100 of FIG. 1, a distributed file system may provide a complete view of all data on each node, without the need to replicate individual data blocks. However, in an application where reliability is important, data redundancy may be improve the system's ability to provide continuous media data to clients twenty four hours a day.

The data redundancy scheme may take advantage of a heterogeneous storage subsystem through a technique called disk merging. Disk merging presents a virtual view of logical disks on top of the actual physical storage system which may include disks with different bandwidths and storage space. The system's application layers may then assume a uniform characteristic for all of the logical disks. Using this abstraction, conventional scheduling and data placement algorithms may be used.

RTP/UDP and Selective Retransmission

A continuous media system such as system 100 of FIG. 1 may support industry standard real-time protocol (RTP) for the delivery of time-sensitive data. Because RTP transmissions are based on the best effort User Datagram Protocol (UDP), a data packet could arrive out of order at the client or be altogether dropped along the network. To reduce the number of lost RTP data packets, a selective retransmission protocol may be implemented. For example, the protocol may be configured to attempt at most one retransmission of each lost RTP packet only if the retransmitted packet would arrive in time for consumption.

In a continuous media system operating in the bipartite mode described above, an additional problem may arise. If a data packet does not arrive, the client may not know which server node attempted to send it. That is, the client may not know where to direct a retransmission request. Solutions to this problems include having the client compute which server node transmitted the lost packet, as well as having the client broadcast the retransmission request to all the server nodes.

Broadcast Approach

Rather than sending the retransmission request to a particular node, the request may be broadcast. Broadcasting the packet retransmission request to all of the server nodes generally places less load on the client. Using this technique, the client does not need to determine which node transmitted the lost packet; instead, each of the nodes receive the request, check whether they hold the packet, and either ignore the request or perform a retransmission. Thus, the client remains unaware of the server sub-layers. However, the broadcast approach may waste network bandwidth and increase server load.

Unicast Approach

A unicast retransmission technique may be more efficient and more scalable than the broadcast technique. In order to send a retransmission request to the appropriate node only, a method of identifying the node is needed. Different methods may be used to identify the appropriate node.

First, when the continuous media system uses pseudorandom block placement as described above, the client may regenerate the pseudorandom number sequence and thereby determine the appropriate node. Thus, the client may use a small amount of meta-data and bookkeeping to send retransmission requests to the specific server node possessing the requested packet.

However, this approach may be difficult to implement from a practical standpoint. For example, upgrading server software may require an update of client software on perhaps thousands of clients as well. Additionally, when the system is scaled up or down (i.e., a node is added to or removed from the system), new parameters (e.g., seed numbers for the pseudo-randomly distributed data) may need to be propagated to the clients immediately so that the appropriate server node can be correctly identified. Additionally, if the client computation is ahead or behind the server computation (e.g., the total number of packets received does not match the number of packets sent), then future computations will generally be incorrect. This may happen, for example, if the client has a limited memory and packets arrive sufficiently out of sequence.

Figure 6:
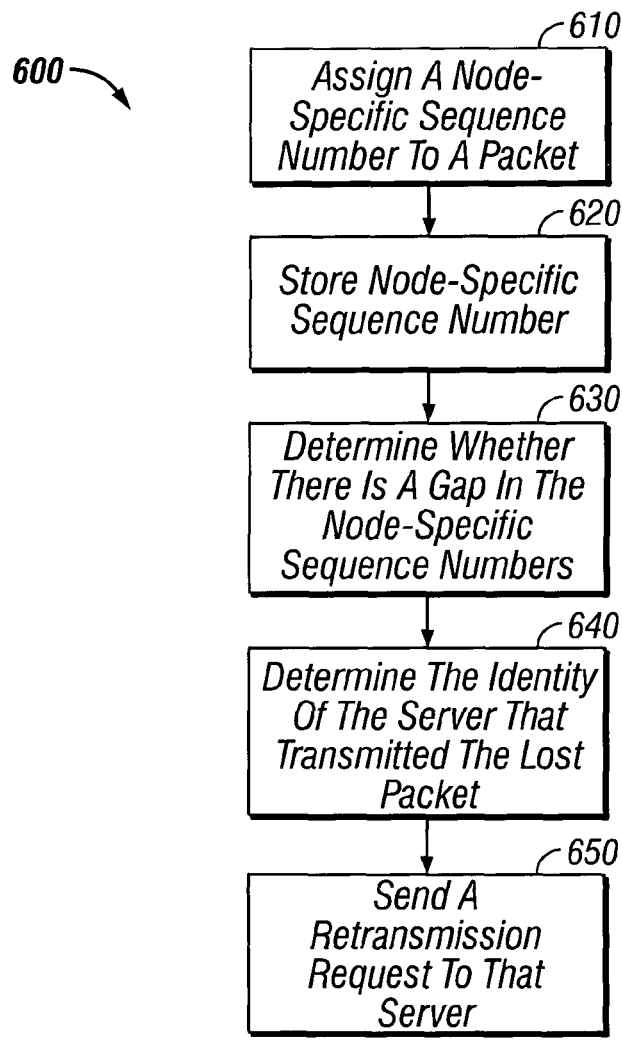
FIG. 6 illustrates a unicast retransmission technique.

An alternative approach follows. Referring to FIG. 6, a process 600 for transmitting portions of a data stream to a client in a sequence includes assigning a node-specific packet sequence number, referred to as a local sequence number (LSN) to a packet (610), in addition to the global sequence number (GSN). The client stores the LSN values for received packets (620), and subsequently determines whether there is a gap in the sequence of LSN (630). If a gap exists, the client determines the identity of the particular server node that transmitted the lost packet using the missing LSN (640). Subsequently, the client sends a retransmission request to the particular server node (650).

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, configured to receive and/or transmit data and instructions, at least one input device, and at least one output device.

A number of implementations have been described. Nevertheless, it will be understood that various modifications may be made without departing from the spirit and scope of the invention. For example, the particular hardware and/or software discussed here is only exemplary. The number of nodes, the node architecture, the amount of memory, the type and capacity of storage, and the operating system may be different. Different schedulers, decoders, media types, and/or flow control schemes may be used. Different client types may be used. Accordingly, other embodiments are within the scope of the following claims.

What is claimed is:

1. A system comprising:
a plurality of storage devices to store data, including data streams including respective data segments in sequences, wherein data segments included in a sequence of a data stream are stored in the plurality of storage devices;
a plurality of data processing devices to couple with a network communication device, the plurality of data processing devices coupled with the plurality of storage devices, each data processing device of the plurality of data processing devices including:
a first module to retrieve a data segment from a storage device of the plurality of storage devices coupled with the data processing device, wherein the data segment is included in the sequence of data segments of a data stream, remaining data segments in the data stream stored in remaining storage devices; and
a second module to schedule transmission of the retrieved data segment to a client according to the sequence, wherein the second module schedules transmission of the retrieved data segment based on schedules of transmissions of corresponding second modules included in remaining data processing devices, each scheduled to transmit data segments retrieved from corresponding storage devices such that all data segments in the data stream are retrieved and scheduled for transmission in the sequence in which the data segments are included in the data stream,
wherein at least one data processing device of the plurality of data processing devices includes a module to provide control information to control a transmission of the data stream, each second module of each data processing device operatively coupled to the module to provide control information, and to schedule transmission of corresponding retrieved data segments according to the control information,
wherein the module to provide control information is included in a data processing device that receives a request for the data stream, and
wherein, in response to the module to provide control information receiving the request, the plurality of data processing devices send the data segments directly to a client requesting the data stream.

2. The system of claim 1, wherein the first module, and the second module are implemented in software.

3. The system of claim 1, wherein the first module, the second module, and the module to provide control information are implemented in hardware.

4. The system of claim 3, wherein the first module, the second module, and the module to provide control information are implemented as circuitry in one or more integrated circuits.

5. The system of claim 1, further including a module to place data segments on the plurality of storage devices.

6. The system of claim 5, wherein the module to place data segments on the plurality of storage devices is to place the data segments in a round-robin placement scheme.

7. The system of claim 5, wherein the module to place data segments on the plurality of storage devices is to place the data segments in a random placement scheme.

8. The system of claim 5, wherein the module to place data segments on the plurality of storage devices is to place the data segments in a pseudorandom placement scheme.

9. The system of claim 1, wherein the first module includes one or more file input/output modules.

10. The system of claim 1, wherein at least one data processing device of the plurality of data processing devices comprises a central processing unit.

11. The system of claim 1, wherein at least one storage device of the plurality of storage devices comprises a disk drive.

12. The system of claim 11, wherein the storage device is implemented in at least one medium chosen from group consisting of a magnetic medium, a semiconductor medium, and an optical medium.

13. The system of claim 1, wherein the network communication devices is part of the system.

14. The system of claim 13, wherein the network communication device is a local network switch.

15. The system of claim 1, wherein each data processing device of the plurality of data processing devices are coupled with the network communication device via a network interface module.

16. The system of claim 15, wherein the network interface module comprises a network interface card (NIC).

17. The system of claim 1, each data processing device sends the data segment directly to the client and not to another data processing device of the plurality of data processing devices, wherein the module to transmit the data segment to the client and not to another data processing device of the plurality of data processing devices includes a real-time transport protocol (RTP) module.

18. A method, comprising:
receiving a request for a data stream from a client, the data stream including a plurality of data segments stored across a plurality of storage devices operatively coupled to a plurality of nodes, wherein the request is received at one of the plurality of nodes of a continuous media server;
designating the one of the plurality of nodes of the continuous media server to provide control information to transmit the data stream to the client, the control information identifying a sequence in which data segments are included in the data stream and controlling a transmission of data segments to the client according to the sequence;
transmitting the data stream as a sequence of data segments from the plurality of nodes directly to the client,
wherein transmitting the data stream comprises
transmitting a first data segment from a first node of the plurality of nodes to the client according to a scheduler module of the first node, the first data segment occupying a first position in the sequence, the retrieval of the first data segment from an associated storage device being based on a data retrieving module of the first node, transmitting of the first data segment being based on the control information, and
wherein transmitting the data stream further comprises
subsequently transmitting a second data segment from a second node of the plurality of nodes to the client according to a scheduler module of the second node, the second data segment occupying a second position in the sequence, the retrieval of the second data segment from an associated storage device being based on a data retrieving module of the second node, transmitting of the second data segment based on the control information,
wherein the control information controls the transmission of the first data segment and the second data segment upon determining that data segments in the first position and the second position are to be transmitted to the client.

19. The method of claim 18, further comprising transmitting at least some of the control information provided by the designated one of the plurality of nodes to the scheduler of the first node and subsequently scheduling the transmission of the first data segment based on the control information.

20. The method of claim 18, further comprising transmitting at least some of the control information provided by the designated one of the plurality of nodes to the scheduler of the second node and subsequently scheduling the transmission of the second data segment using the control information.

21. The method of claim 18, wherein transmitting the data stream further comprises transmitting a third data segment from another node of the plurality of nodes to the client according to a scheduler module of the another node of the plurality of nodes.

22. The method of claim 18, wherein the one of the plurality of nodes of the continuous media server provides control information to transmit the data stream to the client according to the real-time streaming protocol (RTSP).

* * * * *